(12) United States Patent
Purkis et al.

(10) Patent No.: US 10,262,168 B2
(45) Date of Patent: Apr. 16, 2019

(54) ANTENNA FOR USE IN A DOWNHOLE TUBULAR

(71) Applicant: WEATHERFORD TECHNOLOGY HOLDINGS, LLC, Houston, TX (US)

(72) Inventors: Daniel Purkis, Aberdeenshire (GB); Iain Morrison MacLeod, Aberdeenshire (GB)

(73) Assignee: Weatherford Technology Holdings, LLC, Houston, TX (US)

( * ) Notice: Subject to any disclaimer, the term of this patent is extended or adjusted under 35 U.S.C. 154(b) by 1174 days.

(21) Appl. No.: 14/308,336

(22) Filed: Jun. 18, 2014

(65) Prior Publication Data

US 2014/0306853 A1   Oct. 16, 2014

Related U.S. Application Data

(62) Division of application No. 11/667,516, filed on May 9, 2007, now Pat. No. 9,115,573.

(51) Int. Cl.
| | |
|---|---|
| *E21B 47/09* | (2012.01) |
| *E21B 47/10* | (2012.01) |
| *E21B 47/12* | (2012.01) |
| *G06K 7/10* | (2006.01) |
| *H01Q 1/04* | (2006.01) |
| *H01Q 1/22* | (2006.01) |

(52) U.S. Cl.
CPC .......... *G06K 7/10336* (2013.01); *E21B 47/09* (2013.01); *E21B 47/0905* (2013.01); *E21B 47/1015* (2013.01); *E21B 47/12* (2013.01); *E21B 47/122* (2013.01); *E21B 47/124* (2013.01); *H01Q 1/04* (2013.01); *H01Q 1/2216* (2013.01)

(58) Field of Classification Search
CPC .... E21B 47/09; E21B 47/1015; E21B 47/122; E21B 47/124; E21B 47/0905; E21B 47/12; G06K 7/10336; H01Q 1/2216; H01Q 1/04
See application file for complete search history.

(56) References Cited

U.S. PATENT DOCUMENTS

| | | |
|---|---|---|
| 3,227,228 A | 1/1966 | Bannister |
| 3,233,674 A | 2/1966 | Leutwyler |
| 3,914,732 A | 10/1975 | Brumleve et al. |
| 4,432,417 A | 2/1984 | Bowyer |

(Continued)

FOREIGN PATENT DOCUMENTS

| | | |
|---|---|---|
| EP | 1 214 501 | 4/2005 |
| GB | 2247904 | 3/1992 |

(Continued)

OTHER PUBLICATIONS

Snider et al., RFID Downhole Tools and Development for the Drilling Environment, AADE 2009NTCE-16-04-09, American Association of Drilling Engineers, 2009, 3 pages.

(Continued)

*Primary Examiner* — Nicole Coy
(74) *Attorney, Agent, or Firm* — Smith IP Services, P.C.

(57) ABSTRACT

An antenna for use in a downhole tubular. The antenna comprises a generally cylindrical housing and a coiled conductor located within a portion of the housing and separated therefrom by insulating material. The portion of housing has a greater internal diameter than an external diameter of the coiled conductor.

20 Claims, 4 Drawing Sheets

(56) References Cited

U.S. PATENT DOCUMENTS

| | | |
|---|---|---|
| 4,617,960 A | 10/1986 | More |
| 4,698,631 A | 10/1987 | Kelly |
| 4,712,613 A | 12/1987 | Nieuwstad |
| 4,796,699 A | 1/1989 | Upchurch |
| 4,856,595 A | 8/1989 | Upchurch |
| 4,896,722 A | 1/1990 | Upchurch |
| 4,915,168 A | 4/1990 | Upchurch |
| 5,142,128 A | 8/1992 | Perkin et al. |
| 5,146,983 A | 9/1992 | Hromas et al. |
| 5,203,414 A | 4/1993 | Hromas et al. |
| 5,226,494 A | 7/1993 | Rubbo et al. |
| 5,289,372 A | 2/1994 | Guthrie et al. |
| 5,293,936 A | 3/1994 | Bridges |
| 5,343,963 A | 9/1994 | Bouldin et al. |
| 5,360,967 A | 11/1994 | Perkin et al. |
| 5,531,270 A | 7/1996 | Fletcher et al. |
| 5,558,153 A | 9/1996 | Holcombe et al. |
| 5,579,283 A | 11/1996 | Owens et al. |
| 5,611,401 A | 3/1997 | Myers, Jr. et al. |
| 5,706,896 A | 1/1998 | Tubel et al. |
| 5,864,323 A | 1/1999 | Berthon |
| 5,893,413 A | 4/1999 | Lembcke et al. |
| 5,991,602 A | 11/1999 | Sturm |
| 6,012,518 A | 1/2000 | Pringle et al. |
| 6,021,095 A | 2/2000 | Tubel et al. |
| 6,055,213 A | 4/2000 | Rubbo et al. |
| 6,109,357 A | 8/2000 | Zimmerman |
| 6,227,298 B1 | 5/2001 | Patel |
| 6,244,351 B1 | 6/2001 | Patel et al. |
| 6,308,137 B1 | 10/2001 | Underhill et al. |
| 6,333,699 B1 | 12/2001 | Zierolf |
| 6,333,700 B1 | 12/2001 | Thomeer et al. |
| 6,343,649 B1 | 2/2002 | Beck et al. |
| 6,347,292 B1 | 2/2002 | Denny et al. |
| 6,349,772 B2 | 2/2002 | Mullen et al. |
| 6,359,569 B2 | 3/2002 | Beck et al. |
| 6,366,089 B1 | 4/2002 | Poitzsch et al. |
| 6,384,738 B1 | 5/2002 | Carstensen et al. |
| 6,388,577 B1 | 5/2002 | Carstensen |
| 6,414,905 B1 | 7/2002 | Owens et al. |
| 6,443,228 B1 | 9/2002 | Aronstam et al. |
| 6,480,811 B2 | 11/2002 | Denny et al. |
| 6,481,505 B2 | 11/2002 | Beck et al. |
| 6,488,082 B2 | 12/2002 | Echols et al. |
| 6,497,280 B2 | 12/2002 | Beck et al. |
| 6,536,524 B1 | 3/2003 | Snider |
| 6,588,505 B2 | 7/2003 | Beck et al. |
| 6,597,175 B1 | 7/2003 | Brisco |
| 6,604,063 B2 | 8/2003 | Denny et al. |
| 6,624,759 B2 | 9/2003 | Tubel et al. |
| 6,684,953 B2 | 2/2004 | Sonnier |
| 6,710,720 B2 | 3/2004 | Carstensen et al. |
| 6,745,833 B2 | 6/2004 | Aronstam et al. |
| 6,759,968 B2 | 7/2004 | Zierolf |
| 6,760,275 B2 | 7/2004 | Carstensen |
| 6,776,240 B2 | 8/2004 | Kenison et al. |
| 6,782,948 B2 | 8/2004 | Echols et al. |
| 6,788,065 B1 | 9/2004 | Homan et al. |
| 6,789,619 B2 | 9/2004 | Carlson et al. |
| 6,802,373 B2 | 10/2004 | Dillenbeck et al. |
| 6,831,571 B2 | 12/2004 | Bartel |
| 6,915,848 B2 | 7/2005 | Thomeer |
| 6,935,425 B2 | 8/2005 | Aronstam |
| 6,973,416 B2 | 12/2005 | Denny |
| 6,976,535 B2 | 12/2005 | Aronstam |
| 6,989,764 B2 | 1/2006 | Thomeer |
| 7,014,100 B2 | 3/2006 | Zierolf |
| 7,025,146 B2 | 4/2006 | King et al. |
| 7,044,229 B2 | 5/2006 | Tennoy et al. |
| 7,062,413 B2 | 6/2006 | Denny |
| 7,063,148 B2 | 6/2006 | Jabusch |
| 7,066,256 B2 | 6/2006 | Dillenbeck |
| 7,084,769 B2 | 8/2006 | Bauer |
| 7,128,154 B2 | 10/2006 | Giroux |
| 7,159,654 B2 | 1/2007 | Ellison |
| RE39,583 E | 4/2007 | Upchurch |
| 7,201,231 B2 | 4/2007 | Chaplin et al. |
| 7,224,642 B1 | 5/2007 | Tran |
| 7,252,152 B2 | 8/2007 | LoGiudice |
| 7,273,102 B2 | 9/2007 | Sheffield |
| 7,275,602 B2 | 10/2007 | Green |
| 7,283,061 B1 | 10/2007 | Snider |
| 7,295,491 B2 | 11/2007 | Carstensen |
| 7,296,462 B2 | 11/2007 | Gregory |
| 7,322,410 B2 | 1/2008 | Vinegar et al. |
| 7,337,850 B2 | 3/2008 | Contant |
| 7,385,523 B2 | 6/2008 | Thomeer |
| 7,389,205 B2 | 6/2008 | Denny |
| 7,400,263 B2 | 7/2008 | Snider et al. |
| 7,455,108 B2 | 11/2008 | Jenkins |
| 7,461,547 B2 | 12/2008 | Terabayashi et al. |
| 7,484,625 B2 | 2/2009 | Scott |
| 7,500,389 B2 | 3/2009 | Green |
| 7,503,398 B2 | 3/2009 | LoGiudice |
| 7,510,001 B2 | 3/2009 | Spring et al. |
| 7,543,637 B2 | 6/2009 | Green |
| 7,562,712 B2 | 7/2009 | Cho et al. |
| 7,588,100 B2 | 9/2009 | Hamilton |
| 7,591,318 B2 | 9/2009 | Tilghman |
| 7,606,682 B2 | 10/2009 | Denny |
| 7,634,942 B2 | 12/2009 | Green |
| 7,665,527 B2 | 2/2010 | Loretz |
| 7,714,741 B2 | 5/2010 | Snider |
| 7,912,678 B2 | 3/2011 | Denny |
| 7,946,356 B2 | 5/2011 | Koederitz |
| 7,958,715 B2 | 6/2011 | Kinert |
| 7,963,452 B2 | 6/2011 | Moritz |
| 8,016,037 B2 | 9/2011 | Bloom |
| 2001/0054969 A1 | 12/2001 | Thomeer et al. |
| 2002/0194906 A1 | 12/2002 | Goodwin et al. |
| 2003/0029611 A1 | 2/2003 | Owens |
| 2003/0098799 A1 | 5/2003 | Zimmerman |
| 2003/0156033 A1 | 8/2003 | Savage et al. |
| 2003/0174099 A1 | 9/2003 | Bauer |
| 2003/0192695 A1 | 10/2003 | Dillenbeck et al. |
| 2004/0020636 A1 | 2/2004 | Kenison et al. |
| 2004/0020643 A1 | 2/2004 | Thomeer et al. |
| 2004/0083805 A1 | 5/2004 | Ramakrishnan et al. |
| 2004/0163807 A1 | 8/2004 | Vercaemer |
| 2004/0204856 A1 | 10/2004 | Jenkins et al. |
| 2004/0239521 A1 | 12/2004 | Zierolf |
| 2004/0256113 A1 | 12/2004 | LoGiudice et al. |
| 2005/0034863 A1 | 2/2005 | Dillenbeck et al. |
| 2005/0055162 A1 | 3/2005 | Gao et al. |
| 2005/0104176 A1 | 5/2005 | Rodney et al. |
| 2005/0115708 A1 | 6/2005 | Jabusch |
| 2005/0183502 A1 | 8/2005 | Rodney |
| 2005/0230109 A1 | 10/2005 | Kammann |
| 2006/0087448 A1 | 4/2006 | Den Boer |
| 2006/0124310 A1 | 6/2006 | Lopez de Cardenas |
| 2006/0132792 A1 | 6/2006 | Schultz et al. |
| 2006/0175404 A1 | 8/2006 | Zierolf |
| 2007/0046289 A1 | 3/2007 | Troxler |
| 2007/0124220 A1 | 5/2007 | Griggs |
| 2007/0267221 A1 | 11/2007 | Giroux |
| 2007/0272411 A1 | 11/2007 | Lopez De Cardenas |
| 2007/0285275 A1 | 12/2007 | Purkis |
| 2008/0000690 A1 | 1/2008 | Lynde |
| 2008/0041597 A1 | 2/2008 | Fisher |
| 2008/0105427 A1 | 5/2008 | Hampton |
| 2008/0128126 A1 | 6/2008 | Dagenais |
| 2008/0128168 A1 | 6/2008 | Purkis |
| 2008/0149345 A1 | 6/2008 | Marya et al. |
| 2008/0245534 A1 | 10/2008 | Purkis |
| 2008/0271887 A1 | 11/2008 | Snider |
| 2009/0044937 A1 | 2/2009 | Purkis |
| 2009/0065214 A1 | 3/2009 | Purkis |
| 2009/0090502 A1 | 4/2009 | Lumbye |
| 2009/0114401 A1 | 5/2009 | Purkis |
| 2009/0121895 A1 | 5/2009 | Denny |
| 2009/0151939 A1 | 6/2009 | Bailey |
| 2009/0208295 A1 | 8/2009 | Kinert |
| 2009/0223663 A1 | 9/2009 | Snider |
| 2009/0223670 A1 | 9/2009 | Snider |

(56) References Cited

U.S. PATENT DOCUMENTS

| | | |
|---|---|---|
| 2009/0230340 A1 | 9/2009 | Purkis |
| 2009/0266544 A1 | 10/2009 | Redlinger |
| 2009/0272544 A1 | 11/2009 | Giroux |
| 2009/0283454 A1 | 11/2009 | Scott |
| 2010/0044034 A1 | 2/2010 | Bailey et al. |
| 2010/0089583 A1 | 4/2010 | Wei et al. |
| 2010/0170681 A1 | 7/2010 | Purkis |
| 2010/0200243 A1 | 8/2010 | Purkis |
| 2010/0200244 A1 | 8/2010 | Purkis |
| 2011/0148603 A1 | 6/2011 | Denny |
| 2011/0204143 A1 | 8/2011 | Mackenzie |
| 2011/0248566 A1 | 10/2011 | Purkis |

FOREIGN PATENT DOCUMENTS

| | | |
|---|---|---|
| GB | 2360533 | 9/2001 |
| GB | 2381545 | 7/2003 |
| GB | 2391565 | 11/2004 |
| WO | 92/05533 | 4/1992 |
| WO | 00/73625 | 12/2000 |
| WO | 2003062588 | 7/2003 |
| WO | 2006/046075 | 5/2006 |
| WO | 2006/046075 A3 | 5/2006 |
| WO | 2006/051250 A1 | 5/2006 |
| WO | 2006/051250 A8 | 5/2006 |
| WO | 2006/051250 C1 | 5/2006 |
| WO | 2006/082407 | 8/2006 |
| WO | 2006/082421 | 8/2006 |
| WO | 2006/109008 | 10/2006 |
| WO | 2006/120466 A2 | 11/2006 |
| WO | 20061120466 A3 | 11/2006 |
| WO | 20061120466 C1 | 11/2006 |
| WO | 2007/125335 | 11/2007 |
| WO | 2008/059260 A2 | 5/2008 |
| WO | 20081059260 A3 | 5/2008 |
| WO | 2009/050517 A2 | 4/2009 |
| WO | 2009/050517 A3 | 4/2009 |
| WO | 2009/050518 A2 | 4/2009 |
| WO | 20091050518 A3 | 4/2009 |
| WO | 2009/098512 | 8/2009 |
| WO | 2009/109788 | 9/2009 |
| WO | 2009/114356 | 9/2009 |
| WO | 2010/038072 | 4/2010 |
| WO | 2010/086654 | 8/2010 |
| WO | 2010/149643 | 12/2010 |
| WO | 2010/149644 | 12/2010 |
| WO | 2012065123 A2 | 5/2012 |
| WO | 2012065126 A2 | 5/2012 |

OTHER PUBLICATIONS

Runge, Paul, Petrowell Operations Report, Petrowell RFID Circulation Sub First Deployment for CNR International, Aug. 25, 2005, 11 pages.

Fraley et al., RFID Technology for Downhole Well Applications, Drilling and Well Technology, Exploration & Production—Oil & Gas Review, 2007, pp. 60-62.

M-I Swaco, Company News, JPT, May 2008, p. 12.

USPTO, Board of Patent Appeals and Interferences, *Thomeer* v. *Snider and Zierolf*, Patent Interference No. 105,477, Judgement dated Nov. 21, 2006, 3 pages.

USPTO, Board of Patent Appeals and Interferences, *Hubertus* v. *Thomeer and Sarmad Adnan*, Patent Interference No. 105,466, Judgement dated Nov. 21, 2006, 3 pages.

ANTENNA FOR USE IN A DOWNHOLE TUBULAR

RELATED APPLICATION

This application is a division of U.S. patent application Ser. No. 11/667,516, the disclosure of which is incorporated herein by reference in its entirety.

FIELD OF THE INVENTION

The present invention relates to remote actuation of a downhole tool. In particular, the invention utilises RFID technology to communicate data and operating instructions to/from static readers coupled to a downhole tool such as a valve or sliding sleeve.

BACKGROUND OF THE INVENTION

During downhole drilling operations, mud and drilling fluids are circulated within the wellbore by being pumped down through the drill string and returning to the surface via the borehole annulus. Drill cuttings produced during drilling are carried up to the surface through the annulus by the drilling mud. However, in extended reach wells and/or highly deviated or slim diameter wells, the pressure of the drilling mud along the circulation path can drop from that at the surface, which results in a lower cutting lifting performance which in turn can lead to restrictions/obstructions arising in the annulus caused by accumulating cuttings.

In order to alleviate this problem, it is conventional to include one or more downhole circulating subs in the drill string which allow fluid circulation rates to be varied by selectively opening a path from the interior of the drill string to the annulus. Ports in the circulating subs can be opened and closed to enable the flow path of drilling fluids to take a different course, thereby altering the circulation time.

Conventional circulating subs typically comprise a ball seat and, in the event of a restriction in the circulation path at a location in the annulus above that of the circulating sub, a ball, of greater diameter than the seat at its narrowest point, is dropped or pumped through the drill string such that it lands on the ball seat. Once in position, the area above the ball and ball seat becomes sufficiently pressurised to move the ball seat downwards thereby uncovering the ports which enables the drilling fluids to flow through ports in the sidewall of the circulating sub and string into the annulus.

Typically, a series of circulating subs is provided within the drill string at vertically spaced, apart points. In view of the method of operation of the ball seats, vertically higher ball seats necessarily have a greater inner diameter than vertically lower ball seats allowing smaller balls destined for the lower seats to bypass higher circulating subs when dropped downhole. Due to the progressively narrower inner diameter required towards the bottom of the casing, a drill string can usually only accommodate a maximum of six such circulating subs.

The aim of the present invention is to provide an improved circulation sub and an improved method of actuating downhole tools which alleviates problems associated with the prior art described hereinbefore and also provides a means of sending instructions and/or data from/to downhole tools.

BRIEF SUMMARY OF THE INVENTION

According to a first aspect of the present invention there is provided apparatus for operating a downhole tool located in a conduit for the passage of fluid therethrough, the apparatus comprising:

at least one reader associated with the conduit, wherein the at least one reader is arranged to read data and wherein the at least one reader is also arranged for the passage of fluid therethrough;

a downhole tool coupled to the at least one reader; and at least one tag moveable through at least a portion of the conduit and the reader wherein the or each tag is capable of containing data;

such that the reader is capable of reading data from the tag when the tag passes through the reader, thereby enabling remote actuation of the tool.

The inner diameter of the reader can be similar to the inner diameter of the conduit such that the reader does not cause a restriction in the conduit.

The conduit can comprise any downhole tubing string such as a drill string. One example of the downhole tool may be any valve such as a sliding sleeve. "Sliding sleeve" as used herein is intended to refer to any device that can be operated to selectively provide and prevent a flow path between the drill string and the annulus. Sliding sleeves incorporate one or more ports that can be opened or closed by a sliding component and can be used as a circulation sub.

Preferably, the reader can also transmit data and information to the tag regarding operating conditions of the tool or the external environment.

The at least one tag is preferably added to fluid circulating through the conduit. The tag may be recoverable after use in the conduit.

Two or more readers and respective coupled tools can be provided, the readers being individually identifiable or selectable, wherein the tags may be selectively coded with data, such that data from each tag is capable of being received by an individual reader. Therefore, the apparatus may preferably comprise several readers coupled to respective downhole tools and a plurality of tags, with certain tags encoded with data which may be read only by a particular reader with a unique identity for operation of a specific tool.

According to a second aspect of the present invention there is provided a method for operating a downhole tool comprising the steps of:

providing a conduit for the passage of fluid therethrough, the conduit comprising at least one reader also arranged for the passage of fluid therethrough, wherein the at least one reader can read data;

coupling a downhole tool to the or each reader;

providing at least one tag wherein the or each tag is capable of containing data; and moving the or each tag within the conduit and at least partially through the reader such that the reader is capable of reading data from the tag, when the tag passes through the reader, enabling remote operation of the tool.

The method typically comprises the step of running the downhole conduit into a borehole in between steps b) and c) or c) and d).

The method may further comprise the step of matching the inner diameter of the reader and conduit such that the inner diameter of the conduit is not restricted by the reader.

The tool coupled to a reader may be any valve such as a sliding sleeve. The conduit can be a drill string. The reader may also be arranged to transmit data.

Fluid may be circulated through the conduit and the at least one reader. Tags can be added to the circulating fluid. The method may comprise the additional step of recovering the tag after use.

Several readers may be arranged in series. The readers may have portions of conduit therebetween. The method may further comprise the step of providing each reader with a unique identity and selectively coding each tag such that a particular tag is arranged to communicate with a reader having a particular identity. In this way it is possible to target specific tools and send different operating instructions to each tool.

According to a third aspect of the present invention there is provided an antenna for use in a downhole tubular, the antenna comprising:

a generally cylindrical housing;

and a coiled conductor located within a portion of the housing and being separated from the portion of the housing by insulating material, wherein the portion of the housing has a greater internal diameter than the external diameter of the coiled conductor.

At least one antenna can be provided for arrangement in a tubular.

The insulating material can be any suitable non-conducting material, such as air, glass fibre, rubber or ceramic. The antenna may further comprise a liner, wherein the coiled conductor is located or wrapped around the liner, preferably in a helical coaxial manner. Preferably, the housing and liner form a seal around the coiled conductor and insulating material. The housing can be made of steel. Preferably the liner should be non-magnetic and non-conductive to prevent eddy currents. Since the antenna is provided for use downhole, all components comprising the antenna are preferably capable of withstanding the high temperatures and pressures experienced downhole.

The antenna may operate in the frequency range 50 to 200 Khz. The optimum frequency band for the downhole work is 100 to 200 Khz. The most preferable frequency operating band is 125 to 134 Khz. The antenna should be of sufficient length to charge and read the RFID tag while passing through the antenna, allowing all data to be transferred. Preferably the length of the antenna is less than 10 m.

The antenna according to the third aspect of the invention can be used as the reader for the apparatus and method according to the first and second aspects of the invention.

BRIEF DESCRIPTION OF SEVERAL VIEWS OF THE DRAWINGS

Embodiments of the invention will be described with reference to and as shown in the accompanying drawings in which.

DETAILED DESCRIPTION OF THE INVENTION

Figure 1:
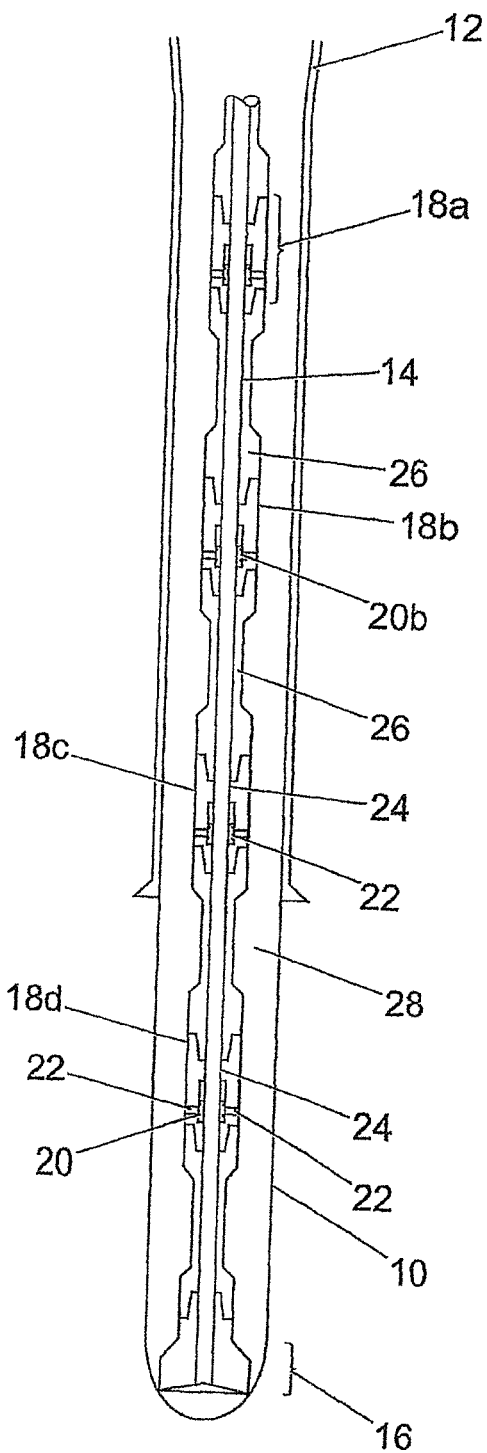
FIG. 1 is a sectional view of a borehole with drill string inserted therein, the drill string having attached apparatus according to the present invention.

FIG. 1 shows a borehole 10 lined in the upper region with a casing 12. A drill string 14 made up of lengths of drill pipe 26 is provided within the borehole 10. A drill bit 16 attached to the lower end of the drill string 14 is acting to drill the borehole 10 to thereby extend the borehole 10. The drill string 14 shown in FIG. 1 has four circulation subs 18a, 18b, 18c and 18d provided therein with drill pipe 26 therebetween. It should be noted that FIG. 1 is not to scale and that there may be many lengths of drill pipe 26 provided in between each of the circulating subs 18. The drill pipe 26 and circulation subs 18 are joined by conventional threaded torque pin and box connections. Each circulation sub 18 shown in FIG. 1 comprises a sliding sleeve valve 20, a port 22 and an antenna 24.

Figure 2:
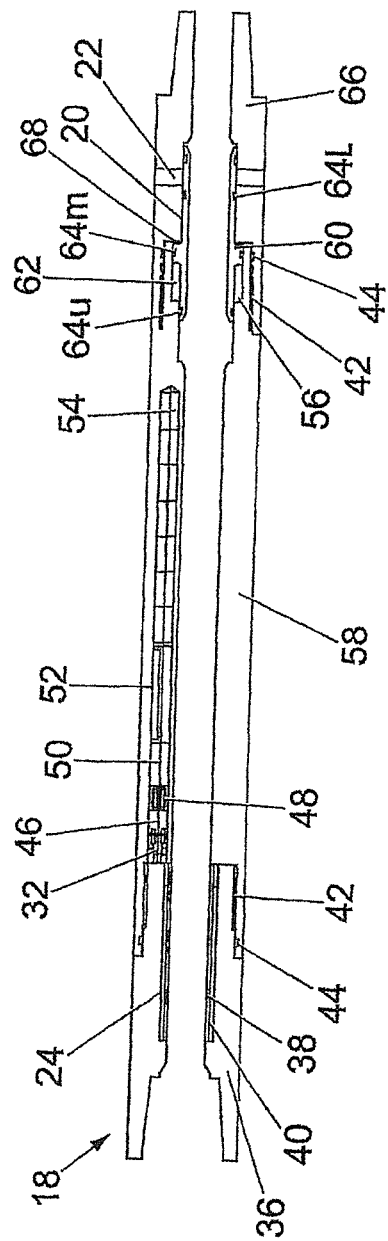
FIG. 2 shows a sectional view of circulation sub apparatus in accordance with the present invention.

FIG. 2 shows a more detailed sectional view of the circulation sub 18. The circulation sub 18 has three main sections; a top sub 36, hydraulic housing 58 and bottom sub 66.

Figure 4:
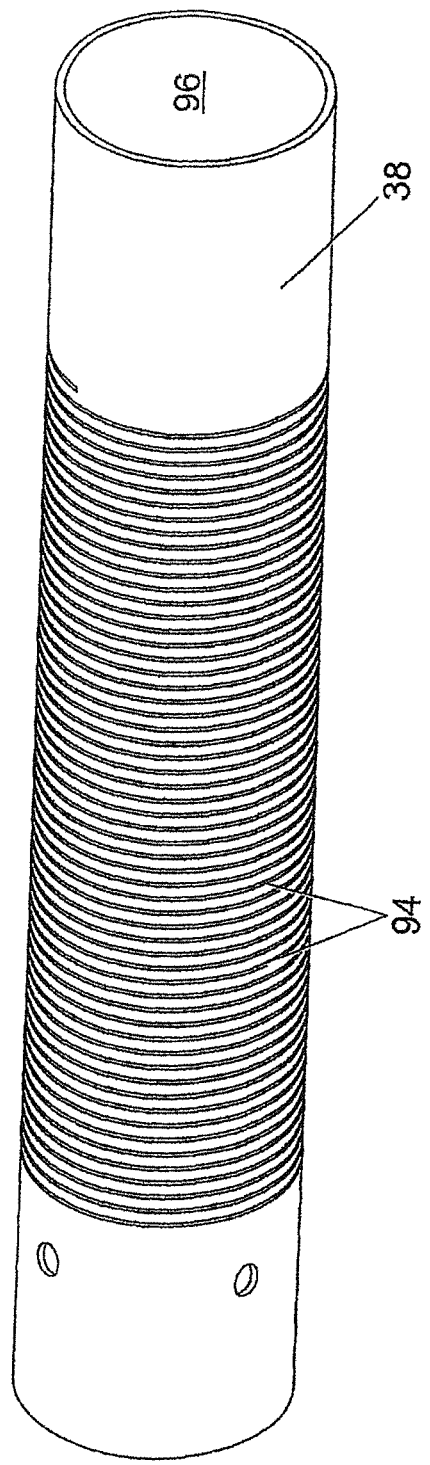
FIG. 4 is a perspective view of liner and coiled conductor required for construction of an antenna according to the present invention.
Figure 5:
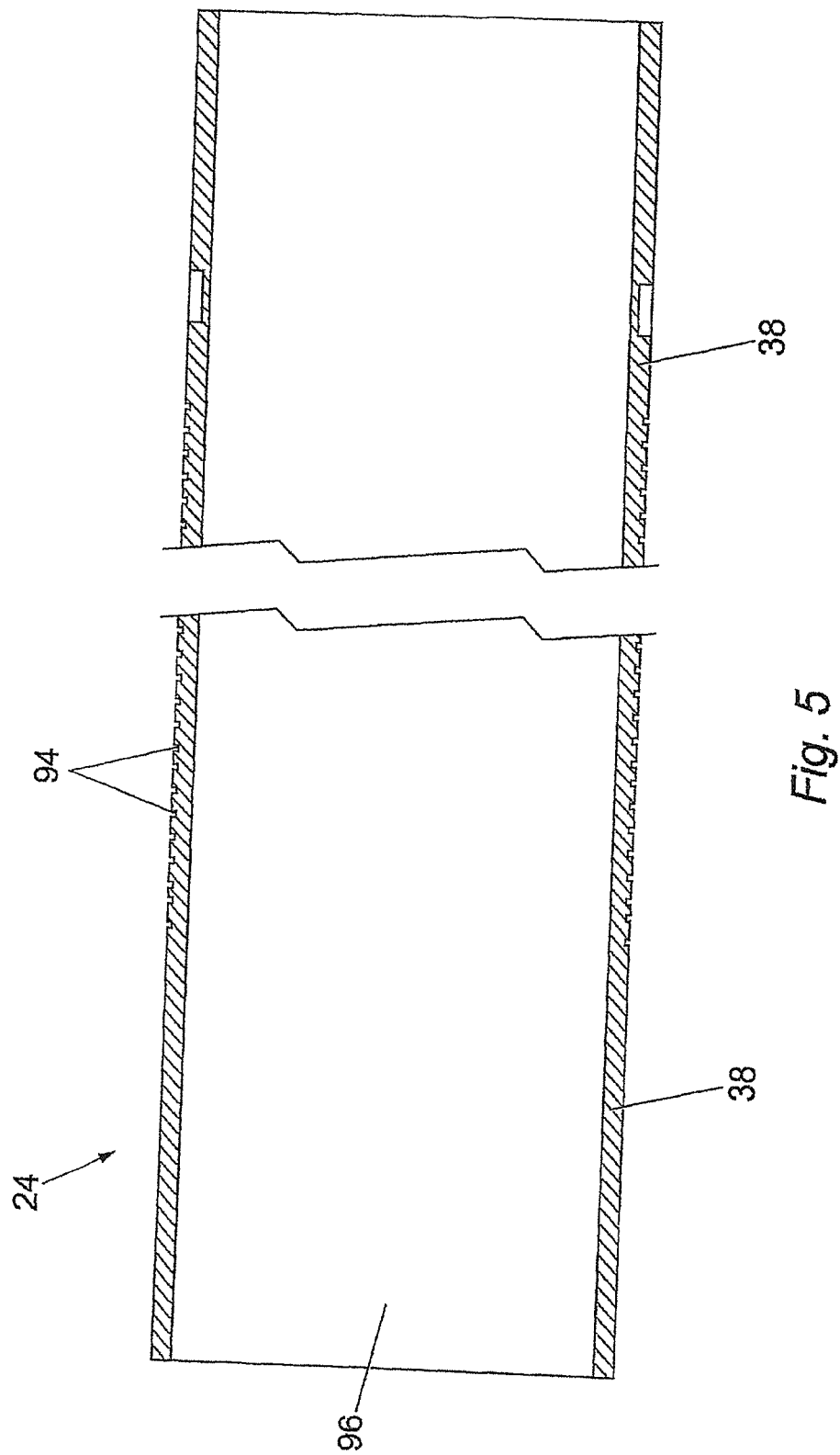
FIG. 5 is a sectional view through the antenna of FIG. 4.

Towards the upper (in use) end of the circulation sub 18 there is provided the top sub 36 in which the antenna 24 is located where the antenna is typically in the region of 10 meters or less in length. As shown in the perspective view of FIG. 4 and sectional view of FIG. 5, the antenna 24 comprises an inner liner 38 located in an enlarged bore portion of the top sub 36, where the liner 38 is formed from a non-magnetic and non-conductive material such as fibreglass, moulded rubber or the like, having a bore 96 extending longitudinally therethrough. The inner bore 96 is preferably no narrower than the inner bore of the drill string 14. A coiled conductor (not shown) typically formed of, for example, a length of copper wire is concentrically wound around the liner 38 within grooves 94 in a helical coaxial manner. Referring again to FIG. 2, insulating material 40 formed from fibreglass, rubber or the like separates the coiled conductor 94 from the recessed bore of the top sub 36 in the radial direction. The antenna 24 is formed such that the insulating material 40 and coiled conductor are sealed from the outer environment and the inner throughbore by the inner liner 38 and the inner bore of the recess of the top sub 36.

The top sub 36 is joined to the hydraulic housing 58 via a pin and box threaded torque connection 42. O-ring seals 44 are also provided to create a fluid tight seal for the connection 42.

Within the hydraulic housing 58, a bulkhead 32 is positioned between outlet ports 70, 71. The outlet ports 70, 71 are ports for a hydraulic pump 46 which lies adjacent a gearbox 48. A motor 50 is connected to an electronics pack 52, both of which are powered by a battery pack 54.

The lower end of the hydraulic housing 58 is connected to a bottom sub 66 which has ports 22 extending through its side wall such that the throughbore of the bottom sub 66 can be in fluid communication with the annulus 28 (shown in FIG. 1) when the ports 22 are uncovered by the sliding sleeve 20. The bottom sub 66 is attached to the hydraulic housing 58 in the usual manner, by threaded connection 42 which are sealed with an O-ring 44. The sliding sleeve 20 is shown in a first position in FIG. 2 covering ports 22.

The inner diameter of the bottom sub 66 is stepped inwardly to create a shoulder 68 against which a piston 60 abuts in the first position when the fluid channel provided by the ports 22 between the throughbore of the bottom sub 66 and the annulus 28 is closed. The piston 60 can also occupy a second position in which the piston 60 abuts a shoulder 56 provided towards the lower end of hydraulic housing 58. FIG. 2 shows the piston 60 occupying the first position with the piston 60 in abutment with the shoulder 68 thereby creating a piston chamber 62. The piston chamber 62 is bordered by the sliding sleeve 20, piston 60, a portion of the hydraulic housing 58 and the shoulder 56. Piston seals 64U and 64M are used to create a fluid tight seal for the chamber 62.

Figure 3:
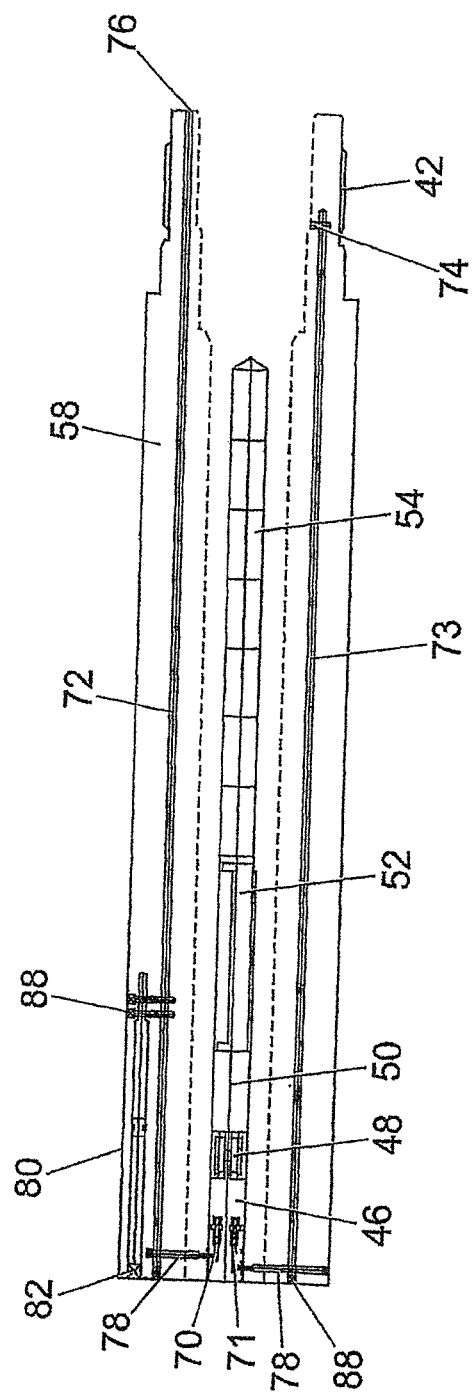
FIG. 3 is a top sectional view of the circulation sub of FIG. 2.

FIG. 3 is a top view of a portion of the hydraulic housing 58 of the circulation sub 18. Connecting lines 78 connect the first pump outlet port 70 with a first hydraulic line 72 and the second pump outlet port 71 with a second hydraulic line 73. At one end, the hydraulic lines 72, 73, 78 are sealed by plugs 88. The other ends of the first and second hydraulic lines 72, 73 are provided with a first chamber opening 76 and a second chamber opening 74 respectively. The openings 74, 76 are arranged such that they are always located within the piston seals 64U, 64L.

The hydraulic line 72 is in fluid communication with a floating piston 80 having a screw plug 82 at one end thereof.

RFID tags (not shown) for use in conjunction with the apparatus described above can be those produced by Texas Instruments such as a 32 mm glass transponder with the model number RI-TRP-WRZB-20 and suitably modified for application downhole. The tags should be hermetically sealed and capable of withstanding high temperatures and pressures. Glass or ceramic tags are preferable and should be able to withstand 20 000 psi (138 MPa). Oil filled tags are also well suited to use downhole, as they have a good collapse rating.

In operation, a drill string 14 as shown in FIG. 1 is positioned downhole. The drill bit 16 suspended on the end of drill string 14 is rotated to extend the borehole 10. Nozzles (not shown) provided on the drill bit 16 expel fluid/mud at high velocity. The drilling fluid/mud is used for bit lubrication and cooling and is also circulated up the annulus created between the outside of the drill string 14 and the inner surface of the borehole to retrieve cuttings from the bottom of the borehole 10. If higher circulation rates are desired, ports 22 can be opened to create a path between the throughbore of the drill string 14 and the annulus 28 at the location of the respective ports 22. This can be achieved using the method and apparatus of the present invention, as described below.

Initially, the ports 22 are closed as they are covered by the sliding sleeve 20, shown in FIG. 1 and in greater detail in FIG. 2.

An RFID tag (not shown) is programmed at the surface by an operator to generate a unique signal in a frequency range which is preferably 125-134 Hz. Similarly, each of the electronics packs 52 coupled to the respective antenna 24, prior to being included in the drill string 14 at the surface, is separately programmed to respond to a specific signal within the preferred frequency range 125-134 Hertz. The RFID tag comprises a miniature electronic circuit having a transceiver chip arranged to receive and store information and a small antenna within the hermetically sealed casing surrounding the tag.

The pre-programmed RFID tag is then weighted, if required, and dropped or flushed into the well with the drilling fluid. After travelling through the inner bore of the drill string 14, the selectively coded RFID tag reaches the specific circulation sub 18 the operator wishes to actuate and passes through the inner liner 38 thereof. During passage of the RFID tag (not shown) through the top sub 36 in the upper end of the circulation sub 18, the antenna 24 housed therein is of sufficient length to charge and read data from the tag. The tag then transmits certain radio frequency signals, enabling it to communicate with the antenna 24. The data transmitted by the tag is received by the adjacent receiver antenna 24. This data is processed by electronics pack 52.

As an example the RFID tag in the present embodiment has been programmed at the surface by the operator to transmit information instructing that a particular sliding sleeve 20 (such as that of the second from bottom circulating sub 18c) is moved into the open position. The electronics pack 52 processes the data received by the antenna 24 as described above and recognises a flag in the data which corresponds to an actuation instruction data code stored in the electronics pack 52. The electronics pack 52 then instructs motor 50, powered by battery pack 54, to drive the hydraulic pump 46 of that circulating sub 18c. Hydraulic fluid is then pumped out of pump outlet 70, through connecting line 78 and hydraulic line 72 and out of chamber opening 76 to cause the space between piston seals 64M and 64L to fill with fluid thereby creating a new hydraulic fluid containing chamber (not shown). The volume of hydraulic fluid in first chamber 62 decreases as the piston 60 is moved towards the shoulder 56. Fluid exits the chamber 62 via chamber opening 74, along hydraulic line 73 and is returned to a hydraulic fluid reservoir (not shown). When this process is complete the piston 60 abuts the shoulder 56. This action therefore results in the sliding sleeve 20 moving towards the hydraulic housing 58 of the circulation sub 18 to uncover port 22 and opens a path from the interior of the drill string 14 to the annulus 26.

Therefore, in order to actuate a specific tool, for example sliding sleeve 20b, a tag programmed with a specific frequency is sent downhole. Sliding sleeve 20b is part of circulating sub 18b and is coupled to an antenna 24 responsive to the specific frequency of the tag. In this way tags can be used to selectively target certain tools by pre-programming readers to respond to certain frequencies and programming the tags with these frequencies. As a result several different tags may be provided to target different tools.

Several tags programmed with the same operating instructions can be added to the well, so that at least one of the tags will reach the desired antenna 24 enabling operating instructions to be transmitted. Once the data is transferred the other RFID tags encoded with similar data can be ignored by the antenna 24.

The tags may also be designed to carry data transmitted from antennas 24, enabling them to be re-coded during passage through the borehole 10. In particular, useful data such as temperature, pressure, flow rate and any other operating conditions of the tool etc can be transferred to the tag. The antenna 24 can emit a radio frequency signal in response to the RF signal it receives. This can re-code the tag with information sent from the antenna 24. The tag is typically recoverable from the cuttings lifted up the annulus from the borehole 10.

Modifications and improvements may be made to the embodiments hereinbefore described without departing from the scope of the invention. For example the sliding sleeve can be replaced by other types of movable tools that require remote actuation. In this case the tools may be operable directly by electrical power from the battery 54, rather than by hydraulic actuation.

The invention claimed is:

1. An antenna for use in a downhole tubular, the downhole tubular having a conduit for passage of fluid through the downhole tubular, the antenna comprising:
   a generally cylindrical housing having a throughbore for the passage of the fluid through the housing, the throughbore of the housing being in fluid communication with the conduit in the downhole tubular;
   a coiled conductor located within a portion of the housing and being insulated from the housing, the portion of the housing in which the coiled conductor is located having a greater internal diameter than an external diameter of the coiled conductor; and
   a non-conducting liner,
   wherein the coiled conductor is coiled around the liner and is co-axial therewith, wherein the antenna is adapted to read data from and/or transfer data to at least one RFID tag carried in the fluid flowing through the throughbore of the housing, and wherein the liner forms at least a portion of an inner surface of the throughbore of the housing.

2. An antenna according to claim 1, wherein the conductor is helically coiled around the liner.

3. An antenna according to claim 1, wherein the housing and the liner form a seal around the coiled conductor.

4. An antenna according to claim 1, wherein the liner is nonmagnetic.

5. An antenna according to claim 1, wherein the antenna is operable in a frequency range from 50 to 200 kHz.

6. An antenna according to claim 1, wherein the antenna is operable in a frequency range between 125 and 134 kHz.

7. An antenna according to claim 1, wherein the antenna is of sufficient length to charge and read the at least one RFID tag when the at least one RFID tag passes therethrough.

8. An antenna according to claim 1, wherein the antenna has a length of less than 10 meters.

9. An antenna according to claim 1, wherein the antenna includes a battery and an electronics pack.

10. An antenna according to claim 1, wherein the throughbore through the housing of the antenna is co-axial with the bore of the conduit through the tubular.

11. An antenna according to claim 1, wherein the liner and the conduit each have an inner diameter and the inner diameter of the liner is not less than the inner diameter of the conduit.

12. An antenna according to claim 11, wherein the inner diameter of the liner is the same as the inner diameter of the conduit.

13. An antenna according to claim 1, wherein the liner has an inner surface and an outer surface, and wherein the coiled conductor is coiled around the outer surface of the liner, and the inner surface of the liner is exposed to the interior of the throughbore of the housing.

14. An antenna according to claim 1, wherein the liner is formed from a nonmetallic material.

15. An antenna according to claim 1, wherein the conductor coil is separated from the housing.

16. An antenna according to claim 15, wherein the conductor coil is separated from the housing by an insulator.

17. An antenna according to claim 1, wherein the conductor coil is recessed in a helical groove on the outer surface of the liner.

18. An antenna assembly, comprising:

a downhole tubular comprising a conduit and having a first antenna according to claim 1, the first antenna being configured to read data from a first RFID tag passing through the conduit of the tubular, and the downhole tubular having a second antenna according to claim 1, the second antenna being configured to read data from a second RFID tag passing through the conduit of the tubular, wherein the first RFID tag is programmed to be read by the first antenna, but not the second antenna, and wherein the second RFID tag is programmed to be read by the second antenna but not the first antenna.

19. An antenna for use in a downhole tubular, the downhole tubular comprising a conduit having an axial bore with an inner surface for passage of fluid through the downhole tubular, the antenna comprising:

a generally cylindrical housing having a throughbore with an inner surface for the passage of the fluid through the housing, and the housing including a circumferential recess extending from the inner surface of the throughbore, the throughbore of the housing being in fluid communication with the conduit of the downhole tubular;

a coiled conductor located within the recess and being insulated from the housing, the recess having an inner surface with a greater internal diameter than an external diameter of the coiled conductor; and a cylindrical, non-conducting, non-magnetic liner with a central bore in fluid communication with the conduit through the tubular, the liner having an inner and an outer surface, the liner being disposed in the recess of the housing, a diameter of the inner surface of the liner being substantially equal to a diameter of the inner surface of the axial bore, wherein the coiled conductor is helically and co-axially coiled around the outer surface of the liner and is disposed radially between the outer surface of the liner and the inner surface of the recess, and wherein the antenna is adapted to read data from and/or transfer data to at least one RFID tag carried in the fluid flowing through the central bore of the liner.

20. An antenna according to claim 19, wherein the conductor is sealed off from the conduit through the tubular by seals disposed between the liner and the housing.

* * * * *